Patented Mar. 20, 1951

2,546,018

UNITED STATES PATENT OFFICE 2,546,018

PRODUCTION OF GLUTARALDEHYDE AND C-SUBSTITUTED GLUTARALDEHYDE FROM DIHYDRO PYRANS

Curtis W. Smith, Berkeley, and Seaver A. Ballard, Orinda, Calif., assignors to Shell Development Company, San Francisco, Calif., a corporation of Delaware No Drawing. Application September 6, 1947, Serial No. 772,598

16 Claims. (Cl. 260—601)

This invention relates to a method of preparing glutaraldehyde (1,5-pentanedial) and C-substitution products thereof. More particularly, the present invention relates to a new method of preparing glutaradehyde ad alkyl and/or aryl substitution products of glutaraldehyde, utilizing as the starting material in the process a derivative of 3,4-dihydro-1,2-pyran which contains an organic group bonded to the carbon atom in the 2-position of the ring through a non-metallic element of group VI of the periodic table, and which contains hydrogen atoms attached to each of the carbon atoms in the 2- and 6-positions of the ring. A specific embodiment of the invention relates particularly to a new method of preparing glutaradehyde utilizing as the essential starting material a 2-(3,4-dihydro-1,2-pyranyl) organic ether.

Glutaraldehyde is a highly reactive chemical compound which, because of its particular characteristics, offers considerable promise as a chemical intermediate for the synthesis of derived chemicals, and in other fields of use. Despite its somewhat unusual and its highly desirable characteristics, this potentially valuable compound has not been commercially available, at least in any but relatively small quantities. A principal reason for its relative unavailability appears to be that up to the present time no practicable method has been developed for its economic production on a commercial scale. It is true that methods are known for its preparation in the laboratory, but these known methods are of such a character that they are not readily adaptable to utilization on an inductrial scale. One method that has been employed frequently for the preparation of glutaraldehyde involves the synthesis of the ozonide of cyclopentene and the decomposition of this product to form, among other products, varying amounts of glutaraldehyde. This known method is attended by definite disadvantages which would render it unattractive for large-scale commercial utilization. One disadvantage is the difficulty and the expense of preparing and employing ozone in large scale commercial quantities. Another disadvantage is the cost of the ozonide and the expense of its production. A still more limiting disadvantage is the highly unstable and explosive nature of the cyclopentene ozonide, merely simple distillation under reduced pressure, as for purposes of purification, almost always causing it to explode with extreme violence. It also is difficult to direct the decomposition of the cyclopentene ozonide so that glutaraldehyde is obtained in practicable yields, the desired product generally being only one of a number of compounds that may be formed by the decomposition of the ozonide. Another method which has been proposed for the laboratory synthesis of glutaraldehyde comprises the treatment of its oxime with nitric oxide or with amyl nitrite. Since this method requires the previous indirect synthesis of the oxime from chemicals which themselves may be prepared only wth difficulty and at considerable expense, and involves an undesirable number of intermediate steps, its value and interest is restricted to use for small-scale preparation of glutaraldehyde. Other methods which occasionally have been proposed for the synthesis of glutaraldehyde are attended with similar undesirable features which render them of little practical value for the preparation of this useful compound on a scale that would satisfy the potential demand for it as an industrial chemical. In contrast with the above prior art process the process of the present invention involves no inherent danger of explosion or other mishap, such as the dangers referred to above. The starting materials which are employed in the process of the invention may be prepared in high yields by a single step directly from basic raw materials which are commercially available in large quantities. Unusually high yields of and conversions to the desired product may be obtained, in many instances the yields of the desired dialdehyde approaching theoretical. Since the yield of the desired product is essentially a measure of its purity from the standpoint of contamination with undesired products of side-reaction, an advantageous result of the high yields is a desirable simplification of the problems that otherwise would be associated with the separation of the highly reactive product from the reaction mixture, and its subsequent purification. The process has the further advantages of requiring a minimum of manipulative steps and of requiring a minimum of expensive or specialized equipment.

Broadly stated, the process of the present invention comprises heating a substituted 3,4-dihydro-1,2-pyran which contains an organic substituent group attached to the carbon atom in the 2-position of the dihydropyran ring through a divalent atom of a non-metallic element of group VI of the periodic table of the elements with water for a time sufficient to effect substantial and appreciable reaction between the substituted dihydropyran and the water, and, if desired, thereafter recovering the glutaraldehyde or the substituted glutaraldehyde thus formed from the reaction mixture.

A preferred embodiment of the invention is represented in the preparation of glutaraldehyde by a process comprising heating a 2-(3,4-dihydro-1,2-pyranyl) alkyl ether (in other words, a 2-alkoxy-3,4-dihydro-1,2-pyran) containing no substituents other than the ethereal alkoxy group attached to the carbon atom in the 2-position of the dihydropyran ring, with water (distilled water or tap water) in the absence of any other added materials in the reaction mixture. When the process is executed according to this preferred embodiment, a suitable 2-(3,4-dihydro-1,2-pyranyl) alkyl ether, preferably one in which the alkyl group is a lower alkyl group, e. g., one derived from a water-miscible lower alkanol, is introduced into a suitable reaction vessel with an amount of water that preferably is greater than about 2 moles per mole of the dihydropyranyl alkyl ether, amounts of water from about 2 to about 10 moles per mole of the dihydropyranyl ether being particularly suitable. The reaction vessel desirably is one which may be sealed from the atmosphere and which is capable of withstanding reasonably elevated pressures, say up to 500 pounds per square inch or more, and it preferably is equipped with a stirrer suitable for vigorously agitating the contents. After the introduction of the dihydropyranyl alkyl ether and the water, the reaction vessel is closed from the atmosphere and its contents are heated, as by the passage of steam or other fluid heat transfer media through a coil located in the interior of the vessel. At the outset of the operations, the reaction mixture comprises two immiscible phases—an aqueous phase and an organic phase. As the heating is continued, the amount of the organic phase diminishes until a point is reached when the mixture becomes completely homogeneous. The time required for this to occur depends upon the temperature at which the mixture is heated, the amount of water that initially was present, and also upon the particular dihydropyranyl ether that is used. At a temperature of about 150° C., for example, it ordinarily requires from about .25 to about 2 hours heating to form a homogeneous mixture. At lower or higher temperatures, longer or shorter times, respectively, ordinarily are required. When the reaction has advanced to the point of forming a homogeneous reaction mixture, the heating may be discontinued. The reaction mixture at this time comprises a solution of glutaraldehyde in the amount of water in excess of the amount required for the reaction, the solution containing the alcohol that corresponds to the alkoxy group of the dihydropyranyl ether. The glutaraldehyde may be recovered from the reaction mixture in any suitable manner if it is desired to obtain the essentially pure dialdehyde. In any event, it is desirable to subject the reaction mixture to distillation or other suitable treatment for removing the alcohol that is present. When the alcohol is a lower aliphatic alcohol, this may be accomplished conveniently by distilling the alcohol from the mixture. The distillation may be continued, if desired, to effect further separation of the glutaraldehyde and the water, or if desired the dialdehyde may be retained in the form of its aqueous solution.

The preferred, non-catalytic conversion of 2-(3,4-dihydro-1,2-pyranyl) alkyl ethers to glutaraldehyde also may be effected under atmospheric pressures by heating a mixture of the dihydropyran with a molar excess of water to an elevated temperature, preferably a temperature at or near the boiling point of the mixture, for a time sufficient to bring about the desired reaction.

*Example I*

As an example of the preparation of glutaraldehyde from a 2-(3,4-dihydro-1,2-pyranyl) alkyl ether, an experiment in which glutaraldehyde was prepared from 2-(3,4-dihydro-1,2-pyranyl) methyl ether may be described in detail. In this experiment, 500 parts by weight or 2-(3,4-dihydro-1,2-pyranyl) methyl ether and 500 parts by weight of water were placed in a glass-lined vessel. The reaction vessel was sealed from the atmosphere and its contents were heated, with agitation, to a temperature of 150° C. under the autogenous pressure of the mixture. The heating was continued for .25 hour and the contents of the reaction vessel then were cooled rapidly. The homogeneous mixture formed by the reaction was withdrawn from the reaction vessel and fractionally distilled. A low-boiling fraction composed chiefly of methyl alcohol containing minor amounts of water was separated first. Additional water containing small amounts of glutaraldehyde next distilled. Thereafter, a final fraction composed of essentially pure glutaraldehyde distilling at 106 to 108° C. under a pressure of 50 mm. Hg was collected. There were recovered 368 parts of essentially pure glutaraldehyde distilling at 106 to 108° C. under a pressure of 50 mm. Hg, corresponding to a conversion of 84% based on the amount of the 2-(3,4-dihydro-1,2-pyranyl) methyl ether applied and a yield of 84% based on the amount of the dihydropyranyl methyl ether consumed.

*Example II*

In another experiment, 2-(3,4-dihydro-1,2-pyranyl) methyl ether was converted non-catalytically to glutaraldehyde by reaction with water at the boiling point of the reaction mixture under atmospheric pressure, with somewhat higher yield of and conversion to the desired product, but with a longer reaction time. In this experiment, 700 parts of water and 700 parts of 2-(3,4-dihydro-1,2-pyranyl) methyl ether were mixed in a reaction vessel equipped with a water-cooled reflux condenser and the mixture was heated to boiling (about 95° C.) with total reflux condensation. Boiling was continued, with reflux condensation, for 8 hours, when a homogeneous mixture had formed. The mixture then was fractionally distilled as in the preceding example, methyl alcohol and water first being separated along with small amounts of glutaraldehyde which came over with the distillate. The final fraction which was separated was composed of essentially pure glutaraldehyde. In this experiment, there were recovered 540 parts of essentially pure glutaraldehyde, corresponding to a conversion of 88% based on the amount of the 2-(3,4-dihydro-1,2-pyranyl) methyl ether applied and a yield of 88% based on the amount of the dihydropyranyl ether consumed.

*Example III*

In another experiment representing a modification of the immediately preceding example, a smaller relative amount of water was employed than in the foregoing experiments. In this experiment, 114 parts by weight of 2-(3,4-dihydro-1,2-pyranyl) methyl ether and 19.8 parts of water were mixed in a reaction vessel equipped with a water-cooled reflux condenser and the mixture was heated to boiling under atmospheric pressure and with total reflux, for 14 hours. The resultant mixture then was fractionally distilled. There were recovered 50 parts of essentially pure glutaraldehyde, corresponding to a conversion of 50% based on the amount of the dihydropyranyl methyl ether employed and to a yield of 75% based on the amount of the dihydropyranyl methyl ether consumed.

The foregoing examples and the preceding descriptive matter relate to an embodiment of the invention which is preferred because of the particular efficacy with which the process may be carried out, and because of the highly desirable product that is formed. In its generic aspects, however, the invention is not to be regarded as limited to this preferred embodiment, since we have discovered that the process may be executed with useful and desirable results according to embodiments other than the preferred, and may be employed to produce dialdehydes other than glutaraldehyde. Since certain of these other aldehydes heretofore could have been prepared only at considerable expense and inconvenience, the process of the present invention is regarded as providing a novel generic method for the preparation of 1,5-dialdehydes of the character herein defined, many of these 1,5-dialdehydes being highly valuable compounds that are useful in the industrial arts. We thus have discovered that glutaraldehyde and hydrocarbon substitution products of glutaraldehyde may be prepared in an improved manner by treating with water at an elevated temperature derivatives of 3,4-dihydro-1,2-pyran which contain an organic group attached to the carbon atom in the 2-position of the dihydropyran ring through a divalent atom of a non-metallic element of group VI of the periodic table and which contain a hydrogen atom attached to each of the carbon atoms in the 2- and 6-positions of the ring and wherein there may be present one or more hydrocarbon groups attached to carbon atoms in the 3,4, and/or 5 positions of the dihydropyran ring. It has been discovered that it is critically essential for attaining the objects of the invention that there be hydrogen atoms attached to the carbon atoms in both the 2- and the 6-positions of the dihydropyran ring, in other words, to both the olefinic carbon atom and the saturated carbon atom to which the oxygen atom in the ring is directly united. Although we prefer to employ those derivatives of 3,4-dihydro-1,2-pyran in which there is an alkoxy group attached to the carbon atom in the 2-position of the ring, other derivatives in which there is an organic group attached to the carbon atom in the 2-position of the dihydropyran by an atom of oxygen or of divalent sulfur, may be employed. The essential structure which must be present may be represented by the structural formula

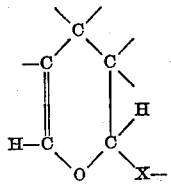

in which X represents an atom of oxygen or a divalent atom of sulfur. When it is desired to prepare glutaraldehyde, the free valencies at the carbon atoms in the dihydropyran ring must be satisfied by atoms of hydrogen. The free valency at the atom X, i. e., at the sulfur or oxygen atom, may be satisfied by various organic groups. Since this atom and the group that is bonded to it by its free valency do not form a part of the final desired product, almost any organic group or atom may satisfy this particular free valency, provided, of course, the compound containing the group or atom is one that is capable of independent existence. It is preferable to employ substituted dihydropyrans containing the above structural grouping in which the group bonded by the free valency at the X atom contains only substantially non-reactive carbon-to-carbon bonds, e. g., aromatic or univalent carbon-to-carbon bonds. For practical reasons, it is preferable to employ a substituted dihydropyran containing the above structural unit in which the free valency at the atom represented by X is a non-reactive hydrocarbon group, such as an alkyl aryl, alkaryl, aralkyl, or cycloalkyl group, or an acyloxy group derived from a carboxylic acid which contains only monovalent and/or aromatic carbon-to-carbon bonds, such as one of the saturated aliphatic monocarboxylic acids or an aromatic carboxylic acid. Because of the greater ease with which the desired dialdehyde product of the process may be recovered from the reaction mixture, and because of other attendant advantages, we prefer to employ those compounds in which the substituent group at the carbon atom in the 2-position of the dihydropyran ring is an alkoxy group, preferably one containing from 1 to about 8 carbon atoms. Representative suitable alkoxy groups are, for example, methoxy, ethoxy, propoxy, isopropoxy, butoxy, isobutoxy, the pentoxy groups, the hexoxy groups, the heptoxy groups, and the like.

For the preparation of C-substituted glutaraldehydes according to the process of the invention, there is employed a derivative of dihydropyran, preferably a 2-alkoxy derivative, containing the above-represented structural unit and having attached to the carbon atoms in positions 3, 4, and/or 5 the hydrocarbon substituent group or groups corresponding to the hydrocarbon substituent group or groups at the non-carbonylic carbon atoms in the desired substituted glutaraldehyde. Representative groups which may be attached to these carbon atoms include, for example, alkyl groups, aryl groups, alkaryl groups, aralkyl groups, olefinically and/or acetylenically unsaturated hydrocarbon groups, etc. One or more of the 3-, 4-, and 5-carbon atoms of the dihydropyran ring may be thus substituted, and the substituent groups may be the same or different.

The process of the present invention is particularly effective and advantageous for the preparation of dialdehydes which have structures represented by the formula

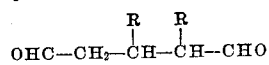

in which each R represents either the hydrogen atom or an alkyl, aryl, alkaryl, or an aralkyl group. For the preparation of dialdehyde represented by the above formula, we preferably may employ derivatives of dihydropyran which have structures represented by the formula

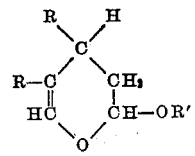

in which R has its above significance, and R' preferably represents an alkyl group, preferably one containing from 1 to about 8 carbon atoms. Groups which may be represented by R include, among others, methyl, ethyl, propyl, isopropyl, butyl, isobutyl, t-butyl, the pentyls, the hexyls, and homologous straight-chain and branched chain alkyl groups, phenyl, naphthyl, and analogous aryl groups, benzyl, phenethyl, 2-phenylpropyl, 3-phenylpropyl, 2-naphthylethyl, and homologous and analogous aralkyl groups, the tolyls, the xylyls, and homologous and analogous alkaryl groups.

Derivatives of 3,4-dihydro-1,2-pyran having structures represented by the last-given structural formula may be prepared conveniently and economically according to the method disclosed and claimed in the copending application, Serial No. 751,980, filed June 2, 1947, now Patent No. 2,514,168. Employing the method of the copending application, an alpha,beta-olefinic aldehyde, such as acrolein or a substituted acrolein containing an alkyl, aryl, alkaryl, or aralkyl group attached to either or to each of the alpha, and the beta carbon atoms, may be reacted with a vinyl compound $CH_2=CH-OR'$, in which R' has its hereinabove significance, at an elevated temperature under conditions which substantially minimize polymerization of the reactants, to prepare directly and in a single step the above derivatives of 3,4-dihydro-1,2-pyran which advantageously may be utilized in the present process. The method of the aforesaid copending application may be practiced by heating a mixture of the alpha,beta-olefinic aldehyde and the said vinyl compound present in about equimolar proportions containing an amount of a polymerization inhibitor, such as hydroquinone, sufficient to substantially minimize polymerization, to a temperature of about 150° C. to about 225° C. under an elevated pressure sufficient to maintain the reaction mixture in the liquid state. Reaction times of from about ½ to about 2 hours may be employed. After the reaction, the desired product formed thereby may be separated from the reaction mixture prior to its use in the present process, or in some case the entire reaction mixture in its crude form may be employed for the preparation of dialdehydes according to the process of the present invention.

The process of the present invention may be executed by heating the derivative of dihydropyran of the above character with water to a temperature which causes the desired reaction to proceed at a practicable rate for a time sufficient to enable the desired reaction to take place, and, if desired, thereafter recovering the desired product from the reaction mixture in any suitable manner. It is desirable to employ temperatures sufficiently elevated so that the reaction is advanced at a practical rate, but not so high that undesired side reactions or decomposition would occur excessively. A range of temperature that is generally suited to the objects of the invention is from about 50° C. to about 200° C. Even higher temperatures frequently may be employed, if desired, although the desired reaction usually may be effected with sufficient rapidity at a temperature within this range so that no particular advantage would be derived from the use of more elevated temperatures. Temperatures as low as 20° C. may be employed at times. There preferably is employed an amount of water corresponding to at least one mole of water per mole of the dihydropyran derivative, amounts of water from about 2 to about 10 moles of water per mole of the dihydropyran derivative being preferred. The use of amounts of water substantially less than one mole per mole of the substituted dihydropyran generally results in a reduced conversion to the desired product, and hence is less desirable. There is no theoretical limit to the maximum amount of water that may be employed. Amounts as great as 1000 or more moles of water per mole of the substituted dihydropyran may be employed. However, if it is desired to ultimately recover from the reaction mixture the dialdehyde that is formed by the reaction, practical considerations usually will limit the maximum amount of water that may be employed to within reasonable limits in view of the necessity, in such a case, for separating water and the dialdehyde from each other. More than about 100 moles of water per mole of the substituted dihydropyran therefore ordinarily would not be employed. Of course, if it is desired to obtain the dialdehyde in the form of a solution, e. g., a dilute aqueous solution, rather than in the isolated state, the limitations imposed by the necessity for separating the water and the dialdehyde do not exist. In such a case, the total amount of water that is required to make the desired solution may be added initially to the reaction mixture, or, alternatively, a smaller amount of water may be used to facilitate removal of by-products of the reaction, etc., and the requisite additional amount of water added at a later time.

The process of the present invention may be executed in the presence of a suitable catalyst for the desired reaction which may increase to a certain extent the reaction rate at the selected temperature. However, particularly in large scale applications of the process, the non-catalytic process has the important advantage of obviating the necessity for any additional steps for the purpose of separating the catalyst from the reaction mixtures as a part of the treatment leading to recovery of the desired product. Since the necessary steps for removal of the catalyst may involve more handling of the reaction mixture than the essential step of the process which brings about the desired reaction, and equipment which otherwise would not be required, the simplification in the overall process that may be realized by use of the non-catalytic process may be substantial. If a catalyst is employed, any suitable acid-reacting material may be employed, such as a strong mineral acid, an acid-reacting salt, or a material which will react under the conditions of the process to form in situ an acid-reacting material. Suitable acid reacting materials which may be employed as the catalyst include, for example, mineral acids such as HCl, $H_2SO_4$, HBr, HI, $H_3PO_4$, $H_4P_2O_7$, $HNO_3$, $H_2SeO_4$, $H_2SO_3$, and the like; acid reacting salts, such as $NaHSO_4$, $NaH_2PO_4$, $KH_2PO_4$, $ZnCl_2$, $MgCl_2$, $ZnSO_4$, $FeCl_3$, $Al_2(SO_4)_3$, and the like. We also may employ compounds which form mineral acids with water, such as $SO_2Cl_2$, $SOCl_2$, $N_2O_3$, $PCl_3$, $PCl_5$, and the like. As the acidic catalyst there also may be employed suitable organic acids, particularly the water-soluble organic acids such as the lower aliphatic carboxylic acids, halogenated aliphatic carboxylic acids, dibasic carboxylic acids, aromatic acids, and the like. It is not necessary that the acid reacting catalyst be infinitely soluble in water, since it is necessary only that amounts sufficient to influence the rate of reaction be present in the dissolved state. Therefore, organic acids that are less soluble than those just mentioned also may be employed as the acid-reacting catalyst if desired, including, for example, sulfonic acids, higher, less-soluble aliphatic carboxylic acids, dialkyl and alkyl acid sulfates, alkylated phosphoric acids, and the like. It is desirable, if an acid-reacting catalyst is employed in large amounts, to use one that is easily separated from the reaction mixture after completion of the desired reaction or, alternatively, one from which the desired product of the reaction may be easily separated. The volatile organic acids, such as the lower aliphatic carboxylic acids which have boiling points that differ from the boiling point of the desired dialdehyde reaction product by an amount sufficient to permit their separation by distillation are among the acid-reacting catalysts from which the desired reaction product may be easily separated, as by fractional distillation. Mineral acids, such as sulfuric acid, hydrochloric acid, or the like, may be removed from the reaction mixture after completion of the reaction by addition of a suitable base or basic salt which forms a water-insoluble salt with the acid, e. g., sulfuric acid may be neutralized by the addition of calcium carbonate, hydrochloric acid may be neutralized by the addition of silver oxide, etc., and the insoluble salt that is formed may be removed by filtration or in other ways which will be apparent to those skilled in the art.

The amount of the acid-reacting catalyst, if one is employed, may be varied over relatively wide limits. In the case of the strong mineral acids and acid-reacting substances of equivalent acidic strength, amounts equivalent to 0.00005 to 1 or more acid-equivalents per liter of the water that is present may be employed advantageously. Amounts of acetic acid as much as 3 times the weight of the water that is present have been used successfully. Other water-miscible organic acids having acidic strengths substantially equivalent to the acidic strength of acetic acid may be used in corresponding amounts. When the acid catalyst is one that must be removed, as by neutralization, prior to recovery of the desired reaction product, it usually is desirable to employ only small amounts in order to minimize the consumption of acid in the process. Those acids which can be recovered, as by distillation directly from the reaction mixture or by separation as a separate action during distillation of the mixture, do not need to be neutralized and hence may be employed in larger amounts without uneconomic consumption of the acid.

The process of the invention may be executed by treating the substituted 3,4-dihydro-1,2-pyran of the herein defined character with water present in the hereinbefore stated amounts, at a suitable reaction temperature, suitable temperatures having been referred to previously herein, until the desired conversion of the substituted 3,4-dihydro-1,2-pyran to a 1,5-dialdehyde has been effected. As illustrated in certain of the preceding examples, the reaction may be effected conveniently by refluxing a mixture of the substituted dihydropyran and water for a length of time sufficient to effect the desired reaction. The exact time that is required in each case is dependent upon the several conditions under which the process is executed, and may vary from .25 hour or less to several hours. We have discovered that at the outset of the reaction, or before reaction has commenced, the derivatives 3,4-dihydro-1,2-pyran which are employed in the present process are substantially immiscible with water, at least to such an extent that they do not form a homogeneous mixture with the amounts of water that preferably are employed in the process. We have further discovered that when the reaction is essentially complete, a homogeneous mixture may be formed, and that in such cases the extent of reaction may be conveniently determined by observation of the relative amounts of the organic and the aqueous phases of the mixture. In order to assure the maximum conversions to the desired product, it frequently may be desirable to continue heating for a short period after a homogeneous mixture has been formed, say for a few minutes to an hour or so, depending upon the length of time that was required to form the homogeneous mixture. Of course, other suitable means may be employed to determine the extent of the reaction at any given time. For example, aliquots of the reaction mixture may be withdrawn at intervals and analyzed by known methods to determine their content of free carbonyl groups, a comparison of the analytically determined carbonyl content with that calculated for theoretically complete reaction affording a convenient measure of the extent of reaction.

After completion of the reaction, the desired 1,5-dialdehyde may be recovered from the reaction mixture in any suitable manner. When we prepare glutaraldehyde and its lower volatile homologs according to the process, we generally prefer to effect the separation by fractional distillation, although other suitable means may be employed if desired. If an acidic catalyst was employed in the process, the catalyst may be removed prior to the distillation, as by conversion to an insoluble salt and separation of the salt, or in some cases, as previously mentioned, the acid catalyst may be separated during the distillation of the reaction mixture. A by-product of the present process is the organic compound corresponding to the formula H—X—R' in which X and R' have their previous significance, e. g., treatment according to the process of the invention of a 2-(3,4-dihydro-1,2-pyranyl) alkyl ether forms as a by-product the alcohol from which the alkoxy group at the 2-position of the dihydropyran ring is derived. The by-product thus formed may be removed either continuously during the reaction, as by effecting the reaction in a reaction vessel equipped with a fractionating reflux column arranged for withdrawal of a fraction containing the alcohol, or the alcohol may be allowed to remain in the reaction mixture and separated after completion of the reaction. Although fractional distillation is a generally convenient manner of recovering the desired product from the reaction mixture, other suitable methods may be employed, if desired. If it is intended to employ the dialdehyde in such an application that its isolation from the reaction mixture is not a prerequisite to its use, its recovery in a pure form may be dispensed with or modified as desired.

It will be apparent to those skilled in the art that the present process may be executed with the aid of any suitable type of apparatus, and that it may be executed in either a continuous, an intermittent, or a batchwise manner. As illustrated in the foregoing and the following examples, the process may be executed conveniently at atmospheric pressures. It also may be executed under pressures above or below atmospheric pressures. The process of the invention is particularly adapted to operation in a continuous manner. A mixture of the substituted dihydropyran of the herein defined character and water may be passed through a continuous reaction tube heated to a suitable temperature at a rate that is correlated with the dimensions of the tube to give the desired residence time at the reaction temperature. The reactants may be either in the vapor state or in the liquid state, the latter being preferred. When it is desired to maintain the reactants liquid, the process may be executed under a pressure at least equal to the vapor pressure of the mixture at the reaction temperature. If greater than atmospheric, such pressures may be either autogenous (i. e., the vapor pressure of the mixture at the reaction temperature), or they may be supplied by means of a suitable pump, or in other ways. Upon egress of the reaction mixture from the heated tube, the mixture may be collected and subsequently separated into its components, or it may be continuously distilled with separation of the desired fractions. It is a particular advantage of the herein described non-catalytic process that the distillation may be effected in a continuous manner, as aforesaid, without the necessity of prior separation of a catalyst or other material from the reaction mixture.

The following examples will illustrate certain additional specific embodiments of the invention. In these examples, the use of catalysts is illustrated, and application of the process to the preparation of substitution products of glutaraldehyde also is exemplified. In the examples, the parts are by weight.

*Example IV*

A mixture of 156 parts of 2-(3,4-dihydro-1,2-pyranyl) isobutyl ether, 60 parts of water, and 2 parts of glacial acetic acid was placed in a reaction vessel equipped with a reflux condenser. The mixture was heated under atmospheric pressure to boiling, with total reflux, and the boiling was continued for 1 hour. At the end of this time, the resultant mixture was fractionally distilled. Glutaraldehyde was separated as the fraction distilling at 106° C. to 108° C. under a pressure of 50 mm. Hg in a yield of 57% and a conversion of 36% based on the amount of 2-(3,4-dihydro-1,2-pyranyl) isobutyl ether consumed and employed, respectively.

*Example V*

In another experiment in which acetic acid was employed as a catalyst, a mixture of 52 parts of 2-(3,4-dihydro-1,2-pyranyl) isobutyl ether, 9 parts of water, and 18.8 parts of glacial acetic acid was heated to boiling under atmospheric pressure with reflux condensation, for .25 hour. At the end of this time the mixture was homogeneous. The mixture was distilled directly with separation of glutaraldehyde as in the preceding example. The yield and the conversion of isolated product were 80% based on the dihydropyranyl ether consumed and employed, respectively.

*Example VI*

In this experiment it was desired to prepare a 30% aqueous solution of glutaraldehyde. A mixture of 242 parts of 2-(3,4-dihydro-1,2-pyranyl) methyl ether, 460 parts of water and 7 parts of glacial acetic acid was refluxed for one hour. At this time the mixture was homogeneous and had acquired a light orange color. Methanol was removed by distillation through a 20-plate fractionating column, the theoretical amount (67 parts) of methanol being recovered. The remaining solution was decolorized by treatment with activated charcoal ("Norite"). The decolorized solution was found, by analysis for carbonyl content, to contain 31.7% glutaraldehyde by weight. Addition of the requisite amount of water reduced the concentration to the desired 30%. The amount of glutaraldehyde solution thus prepared corresponded to 97% of theory.

*Example VII*

One hundred parts of 2-(5-methyl-3,4-dihydro-1,2-pyranyl) methyl ether and 300 parts of a sulfuric acid solution containing 0.2 equivalent of sulfuric acid per liter, were mixed and heated to boiling under atmospheric pressure with total reflux, for two hours. Methanol was distilled from the resulting solution through a 20-plate fractionating column. Six parts of sodium bicarbonate were added to the remaining solution and the water was distilled from the neutralized solution. Alpha-methylglutaraldehyde thereafter was separated as the fraction distilling at 73° C. to 74° C. under a pressure of 10 mm. Hg and amounting to 24 parts. The water which had been removed previously was found, by analysis for carbonyl content, to contain an additional 16 parts of alpha-glutaraldehyde. The total conversion to alpha-methylglutaraldehyde was 45%. The alpha-methylglutaraldehyde that was isolated was found to have a refractive index $(n_D^{20})$ of 1.4442. Its bis-2,4-dinitrophenylhydrazone was prepared and found to melt at 197.5° C. to 198.5° C.

*Example VIII*

A mixture of 84 parts of 2-(4-methyl-3,4-dihydro-1,2-pyranyl) methyl ether and 300 parts of aqueous sulfuric acid containing 0.2 gram equivalent of acid per liter was refluxed for thirty minutes. Methanol was removed from the resulting solution by distillation to a still-head temperature of 70° C. The remaining mixture was neutralized by the addition of 5.5 parts of sodium bicarbonate, then saturated with sodium chloride, and exhaustively extracted with diethyl ether. The ethereal extract was dried and distilled. There were obtained 36.5 parts of beta-methylglutaraldehyde boiling at 75° C. to 80° C. under a pressure of 10 mm. Hg, corresponding to a 32% conversion to product.

In place of the 2-(3,4-dihydro-1,2-pyranyl) alkyl ethers which were employed in the foregoing examples, we may employ other substituted 3,4-dihydro-1,2-pyrans of the herein defined character for the preparation of glutaraldehyde and substituted glutaraldehydes. Ethers wherein the ethereal group attached to the carbon atom in the 2-position of the dihydropyran ring contains one or more carbon-to-carbon unsaturated bonds, as in 2-(3,4-dihydro-1,2-pyranyl) aryl ethers and 2-(3,4-dihydro-1,2-pyranyl) alkenyl ethers, may also be employed. Representative of the ethers of this character which we have converted to glutaraldehyde or derivatives of glutaraldehyde are, for example, 2-(3,4-dihydro-1,2-pyranyl) phenyl ether, 2-(3,4-dihydro-1,2-pyranyl) vinyl ether and the like. In place of the dihydropyranyl ethers, we may employ substituted dihydropyrans of the herein defined character which have a group other than the ethereal oxy group attached in its place to the carbon atom in the 2-position of the dihydropyran ring. Substituted dihydropyrans which contain at the 2-position for example, an acyloxy group, which acyloxy group preferably is derived from an aliphatic carboxylic acid, such as a lower fatty acid, may be employed. We also may employ substituted dihydropyrans wherein the extranuclear oxygen atom at the 2-position of the dihydropyran ring has been replaced by a sulfur atom, as in the corresponding thio ethers and in the sulfur-containing analogs of the foregoing 2-acyloxydihydropyrans that result from replacement of either or both of the oxygen atoms of the acyloxy group by atoms of sulfur. However, it has been discovered that the 2-(3,4-dihydro-1,2-pyranyl) alkyl ethers offer unusual and highly desirable advantages for use in the process of the present invention. Although substituted 3,4-dihydro-1,2-pyrans of the herein defined character other than the preferred 2-(3,4-dihydro-1,2-pyranyl) alkyl ethers thus may be employed in the process of the invention, we have found that the process may be executed with particular and highly desirable advantages when the 2-(3,4-dihydro-1,2-pyranyl) alkyl ethers are employed, and it therefore will be understood that this group of compounds as herein defined constitutes the preferred group within the broader class of compounds that may be employed in the process.

The alpha-methylglutaraldehyde which was prepared in Example VII is a highly reactive, normally liquid dialdehyde which has noteworthy value as an intermediate for resin production, as a chemical intermediate, and in the preparation and compounding of pharmaceutical products. Its unique assymetric structure serves to distinguish it from unsubstituted glutaraldehyde and from the known beta-methylglutaraldehyde, and imparts to it desirable and useful characteristics not possessed by these known compounds.

We claim as our invention:

1. The non-catalytic process of producing glutaraldehyde which comprises the steps of preparing a mixture containing 2-(3,4-dihydro-1,2-pyranyl) methyl ether and water in a molar ratio of from about 1:2 to about 1:10 as its only ingredients, heating the mixture in the liquid state at a temperature of from about 100° C. to about 200° C. until it becomes homogeneous, distilling methanol from the mixture, and recovering the thus formed glutaraldehyde from the remaining portion of the mixture.

2. The non-catalytic process of producing glutaraldehyde which comprises the steps of preparing a mixture containing an unsubstituted 2-(3,4-dihydro-1,2-pyranyl) lower alkyl ether and water in a molar ratio of from about 1:2 to about 1:10 as its only ingredients, heating the mixture in the liquid state until formation of the lower alkanol derived from the lower alkyl ethereal group is substantially complete, distilling the lower alkanol from the mixture, and recovering the thus formed glutaraldehyde from the remaining portion of the mixture.

3. A continuous non-catalytic process of producing glutaraldehyde which comprises the steps of passing a liquid stream of a mixture consisting of an unsubstituted 2-(3,4-dihydro-1,2-pyranyl) lower alkyl ether and water in a molar ratio of from about 1:2 to about 1:10 through an elongated reaction zone at a temperature of from about 100° C. to about 200° C. and recovering glutaraldehyde from the mixture.

4. The non-catalytic process of producing glutaraldehyde which comprises heating a liquid mixture consisting of an unsubstituted 2-(3,4-dihydro-1,2-pyranyl) alkyl ether and water present in a molar ratio from about 1:1 to about 1:100 at a temperature of from about 50° C. to about 200° C. until there has occurred an appreciable and substantial increase in the carbonyl content of the mixture, and recovering the thus formed glutaraldehyde from the mixture.

5. The method of preparing glutaraldehyde which comprises treating an unsubstituted 2-(3,4-dihydro-1,2-pyranyl) alkyl ether with water present in at least an amount equimolar with the said ether in the presence of an acid catalyst at a temperature from about 20° C. to about 200° C. until there has occurred an appreciable and substantial increase in the carbonyl content of the mixture.

6. The method of preparing glutaraldehyde which comprises treating an unsubstituted 2-(3,4-dihydro-1,2-pyranyl) alkyl ether with water present in at least an amount equimolar with the said ether at a temperature from about 20° C. to about 200° C. until there has occurred an appreciable and substantial increase in the carbonyl content of the mixture.

7. The method of preparing an aqueous solution of glutaraldehyde which comprises dissolving an unsubstituted 2-(3,4-dihydro-1,2-pyranyl) lower alkyl ether in water.

8. The method of preparing an aqueous solution of glutaraldehyde which comprises dissolving 2-(3,4-dihydro-1,2-pyranyl) methyl ether in water.

9. The method of preparing an aqueous solution of glutaraldehyde which comprises dissolving an unsubstituted 2-(3,4-dihydro-1,2-pyranyl) lower alkyl ether in acidulated water.

10. The method of preparing a member of the group consisting of glutaraldehyde and its C-substitution products comprising heating in the liquid state at a temperature of from about 50° C. to about 200° C. a substituted 3,4-dihydro-1,2-pyran which contains a hydrogen atom attached to each of the carbon atoms that are bonded to the oxygen atom in the ring and a lower alkoxy group attached to the carbon atom in the 2-position of the ring with from about 1 to about 100 moles of water per mole of the substituted dihydropyran until there has occurred an appreciable and substantial increase in the carbonyl content of the mixture, and recovering the thus formed member of the said group from the mixture.

11. The method of preparing alpha-methylglutaraldehyde which comprises heating 2-(5-methyl-3,4-dihydro-1,2-pyranyl) methyl ether with liquid water at a temperature from about 50° C. to about 200° C. and recovering the thus formed alpha-methylglutaraldehyde from the mixture.

12. The method of preparing a member of the group consisting of glutaraldehyde and its C-substitution products which comprises heating at a temperature of from about 50° C. to about 200° C. a liquid mixture comprising a substituted 3,4-dihydro-1,2-pyran which contains an atom of hydrogen attached to each of the carbon atoms that are bonded to the oxygen atom in the dihydropyran ring and a lower alkoxy group attached to the carbon atom in the 2-position of the ring, water in an amount at least substantially molecularly equivalent to the substituted dihydropyran, and an acidic catalyst, and recovering a member of the said group from the mixture.

13. The method of preparing a member of the group consisting of glutaraldehyde and its C-substitution products which comprises treating with water at a temperature of from about 20° C. to about 200° C. a substituted 3,4-dihydro-1,2-pyran having an atom of hydrogen attached to each of the carbon atoms that is attached to the oxygen atom in the ring and an extranuclear organic group bonded to the carbon atom in the 2-position of the ring through a divalent atom of a non-metallic element of group VI of the periodic table of the elements.

14. The method of producing glutaraldehyde which comprises heating a mono-substituted 3,4-dihydro-1,2-pyran having as the only substituent an organic group attached to the carbon atom at the 2-position of the dyhydropyran ring through an intervening atom of oxygen, said organic group being selected from the class consisting of hydrocarbon and acyl, with water in a molar ratio of from about 1:1 to about 1:100 at a temperature of from about 50° C. to about 200° C.

15. The method of producing glutaraldehyde which comprises heating a mono-substituted 3,4-dihydro-1,2-pyran having as the only substituent an organic group attached to the carbon atom in the 2-position of the dihydropyran ring through a divalent atom of a non-metallic element of group VI of the periodic table of the elements, said organic group being selected from the class consisting of hydrocarbon and acyl, with water in a molar ratio of from about 1:1 to about 1:1000 at a temperature of from about 20° C. to about 200° C.

16. The method of preparing a member of the group consisting of glutaraldehyde and its C-substitution products which comprises treating with water at a temperature of from about 20° C. to about 200° C. a 3,4-dihydro-1,2-pyran having an atom of hydrogen attached to each of the carbon atoms that are attached to the oxygen atom in the ring and having an extranuclear organic group selected from the class consisting of hydrocarbon and acyl bonded to the carbon atom in the 2-position of the ring through a divalent atom of a non-metallic element of group VI of the periodic table of the elements.

CURTIS W. SMITH.
SEAVER A. BALLARD.

REFERENCES CITED

The following references are of record in the file of this patent:

FOREIGN PATENTS

| Number | Country | Date |
|---|---|---|
| 763,286 | France | Apr. 26, 1934 |

OTHER REFERENCES

Woods et al.: J. Am. Chem. Soc., vol. 68 (December 1946), pages 2483 to 2485.

Beilstein: "Handbuch der Org. Chem.," 4th ed., vol. I (1918), pages 776, 787 and 791. Vol. I, 1st supplement (1928), page 405.